United States Patent
Thoni

(10) Patent No.: US 12,194,780 B2
(45) Date of Patent: Jan. 14, 2025

(54) DEVICE AND AN AXLE FOR RAIL VEHICLES

(71) Applicant: Lothar Thoni, Jakobsbad (CH)

(72) Inventor: Lothar Thoni, Jakobsbad (CH)

( * ) Notice: Subject to any disclaimer, the term of this patent is extended or adjusted under 35 U.S.C. 154(b) by 514 days.

(21) Appl. No.: 17/272,365

(22) PCT Filed: Aug. 27, 2019

(86) PCT No.: PCT/EP2019/072787
§ 371 (c)(1),
(2) Date: Mar. 1, 2021

(87) PCT Pub. No.: WO2020/048820
PCT Pub. Date: Mar. 12, 2020

(65) Prior Publication Data
US 2021/0323350 A1    Oct. 21, 2021

(30) Foreign Application Priority Data
Sep. 5, 2018 (DE) .......................... 202018105052.4

(51) Int. Cl.
*B60B 37/06* (2006.01)
*B60B 17/00* (2006.01)
*B60B 27/06* (2006.01)

(52) U.S. Cl.
CPC .......... *B60B 37/06* (2013.01); *B60B 17/0006* (2013.01); *B60B 27/065* (2013.01)

(58) Field of Classification Search
CPC ..... B60B 37/04; B60B 37/06; B60B 17/0006; B60B 27/065; B60B 27/06
See application file for complete search history.

(56) References Cited

U.S. PATENT DOCUMENTS

| | | | | |
|---|---|---|---|---|
| 50,579 A | * | 10/1865 | Harris | ................. B60B 17/0006 295/10 |
| 177,581 A | * | 5/1876 | Souheur | .................. B60B 37/04 295/50 |
| 793,311 A | * | 6/1905 | Moore | ................ B60B 17/0006 29/894.012 |

(Continued)

FOREIGN PATENT DOCUMENTS

| | | |
|---|---|---|
| AT | 113383 | 5/1929 |
| CH | 296879 | 2/1954 |

(Continued)

*Primary Examiner* — Jason R Bellinger
(74) *Attorney, Agent, or Firm* — McHale & Slavin, P.A.

(57) ABSTRACT

A device (1) for rail vehicles. The rail vehicles device incudes a predominantly hollow axle tube (2) extending along a longitudinal direction (LR) and ending in a first wheel flange (3), and a wheel support (4) extending opposite to the longitudinal direction (LR), having a wheel bearing (5), a second wheel flange (6) and a conical mandrel (7). The second wheel flange (6), the first wheel flange (3) and a wheel (8) are arranged therebetween with a wheel hub (9) connected to each other via a flange connection. The conical mandrel (7) is inserted from the wheel holder (4) in a positive-locking manner opposite to the longitudinal direction (LR) through the wheel hub (9) of the wheel (8) into the interior of the axle tube (2) and ends at the fastening element (11), which is arranged and cast into the axle tube (2) and is connected thereto.

11 Claims, 1 Drawing Sheet

(56) References Cited

U.S. PATENT DOCUMENTS

| | | | | | |
|---|---|---|---|---|---|
| 929,347 | A | * | 7/1909 | Todd | B60B 17/0006 |
| | | | | | 295/35 |
| 1,224,760 | A | * | 5/1917 | McDowell | B60B 37/04 |
| | | | | | 295/44 |
| 1,381,635 | A | * | 6/1921 | Hannegan | B60B 37/04 |
| | | | | | 301/105.1 |
| 1,395,913 | A | * | 11/1921 | Ford | B60B 37/04 |
| | | | | | 301/1 |
| 1,488,758 | A | * | 4/1924 | Letora | B60B 37/04 |
| | | | | | 301/110.5 |
| 2,013,139 | A | * | 9/1935 | De Los Rice | B60B 17/0006 |
| | | | | | 295/22 |
| 2,052,702 | A | * | 9/1936 | Eastburg | B60B 37/04 |
| | | | | | 295/42.2 |
| 6,623,057 | B1 | * | 9/2003 | Blasingame | B61F 15/08 |
| | | | | | 295/44 |

FOREIGN PATENT DOCUMENTS

| | | |
|---|---|---|
| DE | 569368 | 2/1933 |
| DE | 658358 | 3/1938 |
| DE | 3931912 | 4/1991 |
| EP | 3094499 | 11/2016 |

\* cited by examiner

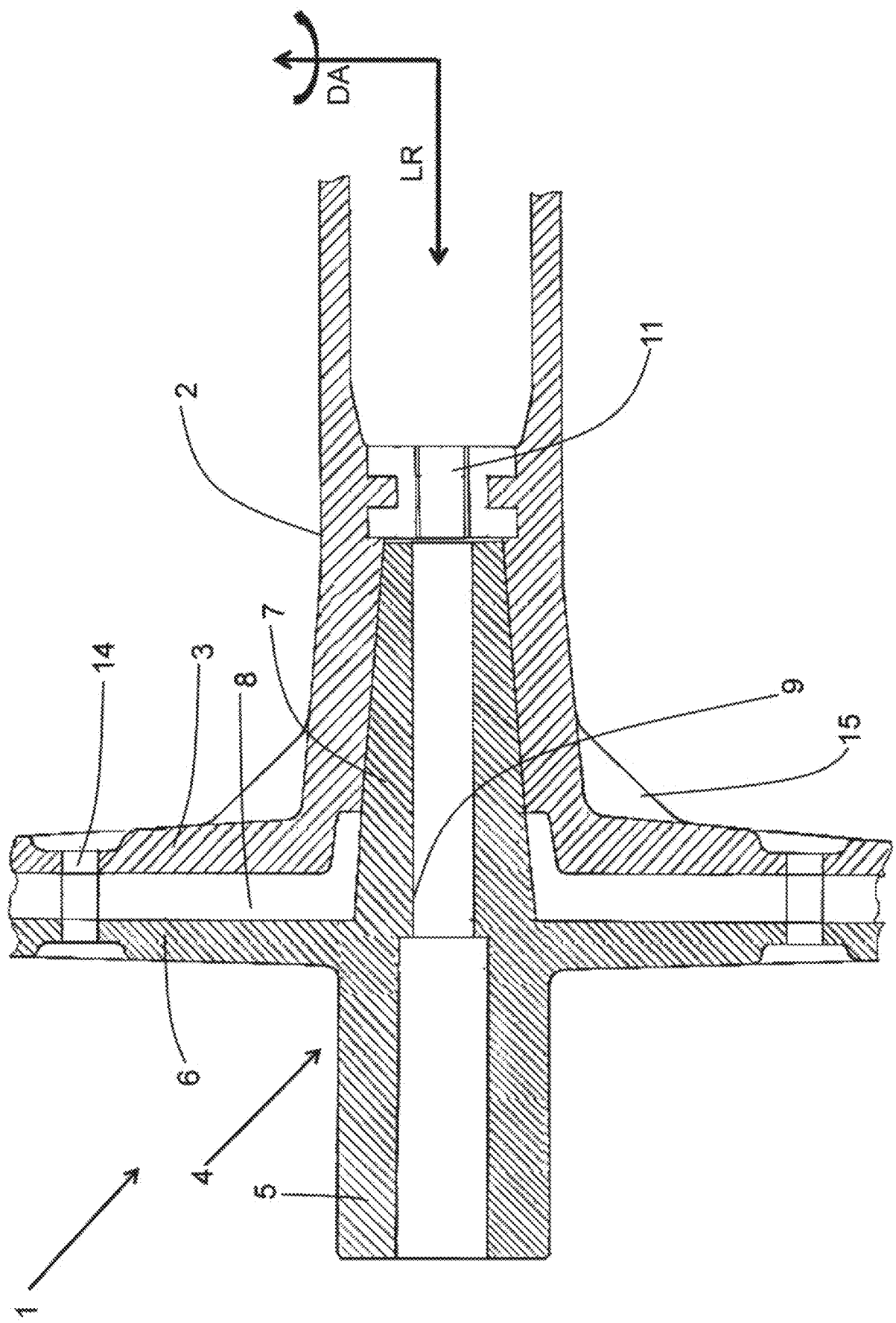

DEVICE AND AN AXLE FOR RAIL VEHICLES

CROSS REFERENCE TO RELATED APPLICATIONS

This is a national stage filing in accordance with 35 U.S.C. § 371 of PCT/EP2019/072787, filed Aug. 27, 2019, which claims the benefit of the priority of German Patent Application No. 202018105052.4, filed Sep. 5, 2018, the contents of each are incorporated herein by reference.

FIELD OF THE INVENTION

The present invention relates to a device and a wheelset axle for rail vehicles.

BACKGROUND OF THE INVENTION

Rail vehicles are track-guided. The running gear of the railway vehicle is responsible for guiding the wheels of the vehicle on the rails, for transferring the load and for its suspension. In addition, the running gear also transfers the driving forces of driven vehicles and the braking forces of all vehicles. Within the running gear the wheelset provides the connection to the track.

A wheelset usually consists of the wheelset bearings and the wheelset axle with two wheels. The wheelset bearings serve to hold the wheelset on the bogie or frame of a rail vehicle. The wheelset bearings are usually designed as plain bearings or roller bearings. The wheelset axle rigidly connects the two wheels. Often, one or more brake discs or drive gears are also mounted on the wheelset axle. The wheelset axle of a rail vehicle carries the weight of the vehicle. The wheelset axle is subjected to bending and torsional stress. The wheels are usually formed as disc wheels with an aperture, namely the wheelset hub, arranged centrally. When producing a wheelset, the wheelset axle is pressed into the center bore under high pressure using a wheelset press. The wheelset axle and wheel are now affixed, thus forming a rigidly connected unit.

Conventional wheelsets are made from a single piece and they have the disadvantage that stresses are built up between the elements when the wheel is loaded due to the positive rigid connection between the wheel and the wheelset axle. These stresses can then lead to cracking in the wheelset axle, for example. In order to detect a crack in the wheelset axle at an early stage, wheelset maintenance is usually carried out every 250,000 km. However, such maintenance is cost-intensive and causes downtimes of the rail vehicle. A wheelset axle that requires less frequent maintenance would therefore be desirable.

DE 39 31 912 A1 concerns a single wheel bearing of a driving wheel on rail vehicles with a transmission housing located on the outside of the driving wheel. Inside the transmission housing, an axle stub is molded on, the free end of which protrudes outwards through an opening in the housing. On the free end of the axle stub, a bushing, which is firmly connected to the driving wheel and protrudes into the housing, is mounted by means of a rolling bearing.

DE 569 368 A concerns a rolling bearing for axles and shafts, preferably for axle bearings of rail vehicles. The rolling bearings are fixed on an axle journal by means of clamping sleeves in the known manner by means of an axle nut.

AT 113 383 B concerns an axle sleeve with two or more roller bearings. For each roller bearing a conical clamping sleeve is provided for mounting on an axle journal-preferably an axle journal of a rail vehicle.

CH 296 879 A concerns an axle bearing with axle. A bearing housing is arranged within an axle journal box. In addition, a journal of the axle is provided, which projects into the bearing housing and has an inner and an outer journal part axially spaced from each other. The two journal sections are of different diameters, with the outer journal part having a smaller diameter than the inner journal part.

SUMMARY OF THE INVENTION

Accordingly, it is the object of the present invention to provide a device and a wheelset axle for rail vehicles which overcomes the disadvantage known in the state of the art.

The device for rail vehicles according to the invention first comprises an axle tube, which is hollow at least in sections, extending in a longitudinal direction and ending in a first wheel flange. Furthermore, the device comprises a wheel support extending opposite to the longitudinal direction, comprising a wheel bearing, a second wheel flange and a mandrel as a cone. The second wheel flange, the first wheel flange and an intermediate wheel with a wheel hub are connected to each other via a flange connection. In addition, the device provides for the mandrel of the wheel support to extend as a cone in a positive-locking manner in the opposite direction to the longitudinal direction through the hub of the wheel into an inner space of the axle tube. At least in the interior of the mandrel there is a central axle which runs in the opposite direction to the longitudinal direction and which ends together with the mandrel in a fastening element arranged within the axle tube, said central axle and mandrel being connected with a bolt. The bolt preferably has a spring washer which compensates for the difference in linear expansion of the different materials caused by different coefficients of thermal expansion.

The characteristic of the device according to the invention is its multi-part construction. As in conventional devices, the wheel is mounted on an axle, namely on the central axle. According to the invention, the wheel is firmly connected to the central axle by means of a mandrel which surrounds the central axle and is positively guided through the hub of the wheel, said central axle being firmly connected to the axle tube via a rotation-symmetric fastening element made of steel. In addition, the wheel is held between two flanges, namely the first wheel flange of the axle tube and the second wheel flange of the axle bearing, which are connected to the wheel via a fixed flange connection. This multi-part construction results in a rigid connection of axle tube and wheel. However, in contrast to known devices, the multi-part design of the device allows the various components of the device to interact more efficiently under load. This significantly reduces the occurrence of stresses within the device compared to known devices. Thus, the probability of cracking in the device due to stresses is decreased. Consequently, the maintenance intervals could be extended when using such a device compared to known devices.

The device according to the invention can be optimized by choosing suitable materials. For example, it is preferably intended that the axle tube is cast from an aluminum alloy, preferably an aluminum alloy which meets the mechanical requirements of the component. In a preferred embodiment, the axle tube is made of AC—AlSi7Mg0.3 or AC—AlCu4Ti. These alloys are particularly suitable for a casting process which is preferably used to produce the axle tube. Preferably, the casting condition or material condition should correspond to the alloy ST6. Aluminum alloys have the additional advantage that they have a lower dead weight compared to other metals or metal compounds and thus, considerable weight savings are possible. A component made of an aluminum alloy is comparatively light. Installed in a rail vehicle, lightweight components are advantageous for the energy efficiency of the vehicle.

The central axle is preferably cast in aluminum. In a preferred embodiment, the mandrel with axle bearing and wheel flange outside is cast from steel or alternatively from a calculated lighter material. Preferably, the wheel support is designed in one piece and accordingly, also the wheel bearing and second wheel flange are made of the same material.

In a preferred embodiment, the central axle extends longitudinally within the wheel bearing of the wheel support. The wheel bearing and wheel support are constructed in such a way that they can be mounted within a wheelset bearing. Preferably, the central axle has a larger diameter in one end section than in its main section. The end section with the larger diameter is preferably the area which accommodates inside the mandrel of the wheel bearing.

Since the fastening element, preferably a cast part made of steel, is firmly connected to the central axle, it is subject to high forces when the wheel is loaded. In order for the fastening element to be able to transmit these forces to the axle tube, it is advantageous if the fastening element is connected to the axle tube in a stable manner. For this reason, a preferred embodiment provides for at least one groove in the fastening element, into which a pin engages that is cast on the inner wall of the axle tube. Preferably, a further pin is cast on the inner wall of the axle tube opposite the first pin, said second pin engaging in a further groove in the fastening element located opposite the first groove. Since the fastening element as a cast part is preferably constructed with a round shape, the wall thickness around the fastening element is preferably balanced and uniform. Usually, during the casting process, the material of the axle tube shrinks onto the fastening element.

In a preferred embodiment, the mandrel, which tapers in the opposite longitudinal direction, fits accurately into the inner walls of the hollow tube. In a preferred embodiment, it is provided that in the area of the end section with first wheel flange the wall thicknesses of the axle tube are adapted to the higher loads and are greater than in the main section of the axle tube. However, for calculation reasons, varying the wall thickness can also be useful in other sections of the axle tube, for example in order to make sections of the axle tube that are subject to particularly high loads more stable by increasing the wall thickness, or in order to achieve further material and weight savings.

In order to optimize the stability of the axle tube, in a preferred embodiment, ribbings can be provided within the axle tube, at least in sections.

In order to make the first wheel flange more stable against the effects of forces in or against the longitudinal direction, for calculation reasons, a preferred embodiment provides for support ribs to be provided on the outside of the axle tube between the axle tube running in the longitudinal direction and the first wheel flange extending vertically to the longitudinal direction.

According to the invention, a wheelset axle for rail vehicles is also claimed, comprising a first device according to the invention and, in mirror image, a second device according to the invention arranged opposite to the longitudinal direction of the first device, wherein the axle tube of the first device is a first end section of an axle and the axle tube of the second device is a second end section of the axle opposite to a first end section. The wheelset axle according to the invention is formed in one piece and shows all the advantages already mentioned above with respect to the device. The wheelset axle according to the invention is suitable to be mounted in common wheelset bearings of a running gear of a rail vehicle. Brake discs and drive gears can also be mounted on the wheelset axle according to the invention, which can already be taken into account in the casting process.

BRIEF DESCRIPTION OF THE FIGURES

FIG. 1 is a cross-sectional view of a part of the wheelset axle for rail vehicles according to the invention. The shown part of the wheelset axle corresponds to device 1 according to the invention, which preferably has a rotation-symmetric construction.

DETAILED DESCRIPTION OF THE INVENTION

Device 1 firstly comprises an axle tube 2 extending in longitudinal direction LR. The walls of the axle tube 2 are preferably cast from an aluminum casting alloy, preferably AlSi7Mg0.3 or AlCu4Ti. The casting condition or material condition preferably corresponds to ST6. The production of higher mechanical properties on the component is supported by casting technology. The axle tube 2 in the shown embodiment is initially hollow on the inside in the longitudinal direction. Depending on the variant, struts can be arranged within the axle tube 2.

It is not shown in FIG. 1 that the axle tube 2 of device 1 extends further into the opposite direction to the longitudinal direction LR and that it forms a first end section of a wheelset axle which is not completely shown. At its oppositely arranged second end section, the wheelset axle merges into an axle tube of a second device rotated in mirror Image by 180° to an axis of rotation DA—wherein the axis of rotation is oriented perpendicular to the longitudinal direction LR. The second device is therefore also part of the wheelset axle. Due to symmetry, said second device is identical to the first device 1, whereby the longitudinal direction of the second device-corresponding to the orientation of the second device 2 rotated in relation to the first device 1—is oriented in mirror image opposite to the longitudinal direction LR of the first device 1. The wheelset axle with first device 1 and second device can be mounted in a wheelset bearing, which is not shown. The axle tube 2 of device 1 ends in the longitudinal direction LR in a first wheel flange 3. Preferably, the first wheel flange 3 is disk-shaped and connected to a wheel 8 with a wheel hub 9 and a second wheel flange 8 via a screw connection. The wheel hub 9 with adapted collar sits on a mandrel 7, wherein said mandrel 7 is inserted with a fit at the end of the axle made of aluminum. The first wheel flange 3 and the tube wall of the axle tube 2 are constructed in such a way that the loads can be optimally absorbed by the component. Opposite to the wheel hub 9, the wheel flange 6 is firmly screwed to the wheel 8. Low-wear materials can be used there to reduce noise and bumping.

Opposite the first wheel flange 3, a second wheel flange 6 is arranged with a wheel bearing and cone (mandrel). The second wheel flange 6 is preferably also disk-shaped and flanged to wheel 8 on that side of wheel 8 which is opposite the first wheel flange 3. The second wheel flange 6, the wheel 8 and the first wheel flange 3 are firmly connected to each other by means of several calculated screws 14, which extend through the first wheel flange 6, the wheel 8 and the second wheel flange 3. It is understood that from the idea of the invention also other known detachable fasteners can be used instead of a screw 14. The wheel support 4 comprises in addition to the second wheel flange 6 a wheel bearing 5 and a mandrel 7. Preferably, the wheel support 4 is constructed in one piece. The wheel support 4 is produced as a casting made of steel or other materials that meet the mechanical requirements.

The mandrel 7 of the wheel support 4 is formed as a cone and is located at the level of the wheel hub 9 of the wheel 8. It extends in the opposite direction to the longitudinal direction LR through the wheel hub 9 of the wheel 8 into an inner space of the axle tube 2. It is positively connected to the wheel hub 9 of the wheel 8. In the interior of the axle tube 2 it rests against the inner walls of the axle tube 2. Therefore, at least in the area of the mandrel 7, the material thickness of the walls of the axle tube 2 varies so that the diameter of the interior of the axle tube 2 adapts to the diameter of the tapering mandrel 7. The mandrel 7 ends with tolerance at a fastening element 11 which is cast into the interior of the axle tube 2, said fastening element being discussed below.

The wheel support 4 is provided with a bore serving a firm connection, preferably a screw connection, of the wheel support 4 with the cast part 11 as a fastening element. Said screw connection is performed with a spring washer in order to compensate for the different coefficients of expansion in the event of temperature changes (not shown). Support ribs 15 are arranged on the outer sides of the axle tube 2 between the axle tube 2 extending in the longitudinal direction LR and the first wheel flange 3 extending vertically to the longitudinal direction LR. Said support ribs 15 serve to stabilize against loads and forces acting in longitudinal and transverse direction onto the first and second wheel flanges 3, 6 with the wheel 8 arranged in between. The position and size of the optional support ribs 15 are to be arranged and formed according to the calculation and according to the installation space.

The wheel 8 is a rotary component made of steel which can be manufactured separately from normal round steel. The centrally arranged axle tube 2 with wheel flanges 3, 6 on both sides accommodates the wheels 8 on both sides, wherein the wheels 8 are screwed to the axle tube 2 with the wheel bearings 5 and the wheel flanges 3, 6 above the mandrel 7 which is designed as a cone.

The invention claimed is:

1. A device for rail vehicles comprising:
a predominantly hollow axle tube extending along longitudinal direction (LR) and ending in a first wheel flange;
a wheel support comprising a wheel bearing, a second wheel flange and a conical mandrel,
wherein the second wheel flange, the first wheel flange and a wheel arranged therebetween with a wheel hub are connected to each other by a flange connection,
wherein the conical mandrel is inserted from the wheel support in a positive-locking manner through the wheel hub of the wheel into the interior of the axle tube and ends at a fastening element, which is arranged and cast into the axle tube, and is connected thereto.

2. The device according to claim 1, wherein the axle tube is cast from an aluminum alloy.

3. The device according to claim 1, wherein the axle tube is cast from AC—AlSi7Mg0.3 or AC—AlCu4Ti.

4. The device according to claim 1, wherein the connection between the conical mandrel and the fastening element is made by a screw connection.

5. The device according to claim 1, wherein the conical mandrel is cast from steel.

6. The device according to claim 1, wherein the fastening element is constructed as a rotation-symmetric rotary component made of steel, which is provided with constrictions and which is cast and shrink-fitted into the axle tube.

7. The device according to claim 1, wherein the wall thickness of the axle tube is adapted to the optimum distribution of the stresses due to loads and forces and to the installation space.

8. The device according to claim 1, wherein the axle tube comprises cast parts as fastening elements made of steel.

9. The device according to claim 1, wherein between the axle tube extending in the longitudinal direction (LR) and the first wheel flange extending perpendicular to the longitudinal direction (LR) support ribs are arranged on the outside of the axle tube.

10. A wheelset axle for rail vehicles, comprising a first device according to claim 1 and a second device according to claim 1, which is arranged in mirror image to the longitudinal direction (LR) of the first device, wherein the axle tube of the first device is a first end section of an axle and the axle tube of the second device is a second end section of the axle opposite to the first end section.

11. The wheelset axle according to claim 10, wherein the axle tube with wheel flanges on both sides receives the wheels on both sides, wherein the wheels are screwed to the axle tube.

* * * * *